(12) United States Patent
Mayer et al.

(10) Patent No.: US 6,429,251 B2
(45) Date of Patent: Aug. 6, 2002

(54) POLYVINYL ALCOHOL-STABILIZED 1,3-DIENE/ (METH)ACRYLATE COPOLYMERS

(75) Inventors: Theo Mayer, Julbach; Reinhard Härzschel, Burghausen, both of (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 56 days.

(21) Appl. No.: 09/729,933

(22) Filed: Dec. 5, 2000

(30) Foreign Application Priority Data

Dec. 23, 1999 (DE) .......................... 199 62 568

(51) Int. Cl.⁷ ............................... C08L 47/00
(52) U.S. Cl. .................. 524/459; 524/503; 526/202
(58) Field of Search ................ 524/459, 503, 524/803; 526/202

(56) References Cited

U.S. PATENT DOCUMENTS

| | | |
|---|---|---|
| 4,397,968 A | 8/1983 | Eck et al. |
| 5,200,459 A | 4/1993 | Weih et al. |
| 5,733,944 A | 3/1998 | Balk et al. |
| 5,753,036 A | 5/1998 | Hornaman et al. |

FOREIGN PATENT DOCUMENTS

| | | |
|---|---|---|
| AU | 83 549782 | 11/1982 |
| DE | 24 42 121 | 3/1976 |
| DE | 195 48 313 | 6/1997 |
| EP | 0 062 106 | 10/1982 |
| EP | 0 065 162 | 11/1982 |
| EP | 744 418 | 11/1996 |
| GB | 1 438 449 | 6/1976 |
| WO | WO 97/15603 | 5/1997 |
| WO | 99/28360 | 6/1999 |

OTHER PUBLICATIONS

Derwent Abstract corresponding to WO–A–9928360 [AN–1999–358110].
European Search Report.
Fox, T.G., Bull. Am. Physics Soc. 1,3, p. 123 (1956).
Polymer Handbook, 2$^{nd}$ Edition, J. Wiley & Sons, New York (1915).
English Literal Translation of WO 99/28360.

Primary Examiner—Christopher Henderson
(74) Attorney, Agent, or Firm—Brooks & Kushman P.C.

(57) ABSTRACT

The invention discloses polyvinyl alcohol-stabilized copolymers of 1,3-dienes with methacrylates and/or acrylates in the form of their aqueous polymer dispersions or polymer powders redispersible in water, and to a process for their preparation and their use.

16 Claims, No Drawings

POLYVINYL ALCOHOL-STABILIZED 1,3-DIENE/ (METH)ACRYLATE COPOLYMERS

BACKGROUND OF THE INVENTION

1) Field of the Invention

The invention relates to polyvinyl alcohol-stabilized copolymers of 1,3-dienes with methacrylates and/or acrylates in the form of their aqueous polymer dispersions or polymer powders redispersible in water, and to a process for their preparation and their use.

2) Background Art

As explained in WO-A 97/15603, polymer dispersions which are stabilized with polyvinyl alcohol (PVA1) have characteristic rheology and tack properties, so that, in contrast to emulsifier-stabilizer dispersions, they are particularly suitable for coating and adhesive applications. For example, paper packaging adhesives prepared using emulsifier-stabilized copolymer dispersions have poor machine running properties compared with PVA1-stabilized copolymer dispersions, owing to the fine particles (particle size in general <400 nm), the rheology and the low surface tension of the emulsifier-stabilized dispersion. A disadvantage of the adhesives prepared using vinyl ester-based or acrylate-based copolymer dispersions is that, owing to their generally relatively high glass transition temperature (Tg) or the minimum film formation temperature (MFT), the addition of plasticizer for processing is necessary.

Using vinyl acetate/ethylene copolymer dispersions, it is possible to prepare plasticizer-free paper packaging adhesives which have improving adhesion properties with increasing ethylene content and hence associated declining Tg. A disadvantage of the adhesives prepared using polyvinyl alcohol-stabilized vinyl acetate/ethylene copolymer dispersions is that the reduction in Tg due to copolymerization with ethylene is subject to limits owing to the crystallization of the vinyl acetate/ethylene copolymers.

By copolymerizing 2-ethylhexyl acrylate, glass transition temperatures Tg down to below −50° C. can be achieved with polymer dispersions based on acrylate polymers. However, pure acrylate dispersions on an alkaline substrate release the corresponding alcohol at pH>9, owing to hydrolysis of the ester group. Thus, 2-ethylhexyl alcohol is released from 2-ethylhexyl acrylate and may be released into the surrounding air. Moreover, by oxidation of 2-ethylhexyl alcohol to the corresponding acid, secondary products which are not toxicologically safe can be produced. A further side effect is that polyacrylic acid domains having a very high Tg are obtained by hydrolysis of the ester group. The high Tg in turn has an adverse effect on the viscoelastic modulus of the resin and hence a negative effect on a number of performance characteristics such as wetting and adhesion.

It was therefore the object to provide a hydrolysis-stable dispersion or powder type whose polymer resin can be prepared in a wide Tg range (−80° C.<Tg<+100° C.). The aqueous dispersion or redispersion should have the advantageous Theological properties (machine running properties) of polyvinyl alcohol-stabilized vinyl ha ester or acrylate dispersions and should have good adhesion to a very wide range of substrates such as paper, plastics and minerals, even in the case of low Tg and in the absence of plasticizer.

This object was achieved by a process by means of which polyvinyl alcohol-stabilized copolymers of 1,3-dienes with methacrylates and/or acrylates are obtainable in the form of their aqueous polymer dispersions or polymer powders redispersible in water.

DE-A 2442121 (GB-A 1438449) disclosed that polyvinyl alcohol is not effective as a sole dispersant in the preparation of polymers of (meth)acrylates or butadienes and has therefore always been used as a mixture with emulsifiers. DE-A 2442121 therefore recommends the use of a polyvinyl alcohol modified with alkali metal olefin sulfonate for the preparation of polyvinyl alcohol-stabilized polymers of (meth)acrylate or butadiene monomers. The disadvantage is that this too is an ionic stabilizer and the disadvantages occurring in the case of emulsifiers and described above therefore also occur.

WO-A 97/15603 describes butadiene/(meth)acrylate copolymers which are stabilized with polyvinyl alcohol and emulsifiers and are obtained by grafting the polyvinyl alcohol moiety onto the copolymer by means of a functionalized silane, especially mercaptotrialkoxysilane.

U.S. Pat. No. 5,200,459 recommends copolymerization in the presence of a stabilizing solvent, in particular from the group consisting of the alcohols, for the preparation of polyvinyl alcohol-stabilized, aqueous butadiene copolymer latices.

WO-A 99/28360 discloses the preparation of polyvinyl alcohol-stabilized styrene/butadiene copolymer dispersions or dispersion powders. However, styrene-containing copolymer dispersions have the disadvantage of having viscoelastic polymer properties disadvantageous for many applications (for example in adhesives) (poor deformability). In the copolymer styrene produces polymer domains having a high Tg; these lead to relatively disadvantageous viscoelastic resin properties. This results, for example in the case of adhesives, in poorer wetting properties and poorer tack.

DE-A 19548313 (U.S. Pat. No. 5,733,944) and EP-A 744418 (U.S. Pat. No. 5,733,944) disclose processes for the preparation of aqueous dispersions of butadiene/(meth) acrylate copolymers which are prepared in the presence of a protective colloid and an emulsifier.

The invention relates to emulsifier- and solvent-free copolymers, stabilized with nonionic polyvinyl alcohol as protective colloid, of 1,3-dienes with methacrylates and/or acrylates in the form of their aqueous polymer dispersions or polymer powders redispersible in water, obtainable by emulsion polymerization and optionally drying of the polymer dispersions obtained thereby, from 10 to 100% by weight of the amount of polyvinyl alcohol being initially introduced before the initiation of the polymerization and the remaining amount being metered in during polymerization, and the addition of polyvinyl alcohol and the comonomers being controlled in such a way that, during the polymerization, the amount of protective colloid is always from 1 to 70% by weight of the total amount of free comonomers.

The invention furthermore relates to a process for the preparation of emulsifier- and solvent-free copolymers, stabilized with polyvinyl alcohol as a protective colloid, of 1,3-dienes with methacrylates and/or acrylates in the form of their aqueous polymer dispersions or polymer powders redispersible in water, by emulsion polymerization of a mixture containing one or more comonomers from the group consisting of the 1,3-dienes and one or more comonomers from the group consisting of the methacrylates and acrylates, in the presence of from 1 to 15% by weight, based on the total weight of the monomers, of one or more polyvinyl alcohols and optionally drying of the polymer dispersions obtained thereby, from 10 to 100% by weight of the amount of polyvinyl alcohol being initially introduced before the initiation of the polymerization and the remaining amount being metered in during polymerization, and the addition of polyvinyl alcohol and of the comonomers being controlled in such a way that, during the polymerization, the amount of protective colloid is always from 1 to 70% by weight of the total amount of free comonomers.

Suitable 1,3-dienes are 1,3-butadiene and isoprene, 1,3-butadiene being preferred. Suitable methacrylates and acrylates are those of straight-chain and branched alcohols having 1 to 10 carbon atoms. Preferred methacrylates are methyl methacrylate, ethyl methacrylate, propyl methacrylate and n-butyl methacrylate. Methyl methacrylate is particularly preferred. Preferred acrylates are methyl acrylate, ethyl acrylate, propyl acrylate, n-butyl acrylate, tert-butyl acrylate t-butylmeth acrylate and 2-ethylhexyl acrylate. Methyl acrylate, n-butyl acrylate and 2-ethylhexyl acrylate are particularly preferred.

If required, from 1 to 30% by weight, based on the total weight of the monomer mixture, of further monomers copolymerizable with 1,3-dienes and with the (meth)acrylates such as ethylene, vinyl chloride or vinyl esters of straight-chain or branched carboxylic acids having 1 to 15 carbon atoms, for example vinyl acetate, and vinyl esters of alpha-branched monocarboxylic acids having 5 to 11 carbon atoms such as VeoVa9® or VeoVa10® (trade names of Shell), can also be copolymerized.

If required, from 0.05 to 10% by weight, based on the total weight of the monomer mixture, of auxiliary monomers may also be copolymerized. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid such as the diethyl and diisopropyl esters, and maleic anhydride, ethylenically unsaturated sulfonic acid and its salts, preferably vinylsulfonic acid or 2-acrylamido-2-methylpropanesulfonic acid. Further examples are pre-crosslinking comonomers such as polyethylenically unsaturated comonomers, for example divinyl adipate, diallyl maleate, allyl methacrylate or triallyl cyanurate, or postcrosslinking comonomers, for example acrylamidoglycolic acid (AGA), methylacrylamidoglycolic acid methyl ester (MAGME), N-methylolacrylamide (NMA), N-methylolmethacrylamide, N-methylol allylcarbamate, alkyl ethers such as isobutoxy ether, or esters of N-methylolacrylamide, of N-methylolmethacrylamide and of N-methylol allyl carbamate. Comonomers having epoxide functional groups such as glycidyl methacrylate and glycidyl acrylate, are also suitable. Further examples are comonomers having silicon functional groups such as acryloyloxypropyltri(alkoxy)silanes and methacryloyloxypropyltri(alkoxy)silanes, vinyl trialkoxysilanes and vinylmethyldialkoxysilanes, it being possible, for example, for ethoxy and ethoxypropylene glycol ether radicals to be present as alkoxy groups. Monomers having hydroxyl or CO groups may also be mentioned, for example hydroxyalkyl methacrylates and acrylates such as hydroxyethyl, hydroxypropyl or hydroxybutyl acrylate or methacrylate, and compounds such as diacetoneacrylamide and acetylacetoxy methyl acrylate or methacrylate.

The choice of monomers or the choice of the amounts by weight of the comonomers is made in such a way that in general a glass transition temperature Tg of from −80° C. to +100° C., preferably from −50° C. to +50° C., particularly preferably from −20° C. to +40° C., results. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956), the following is applicable: $1/Tg = x_1/Tg_1 + x_2/Tg_2 + \ldots + x_n/Tg_n$, where $x_n$ represents the mass fraction (% by weight/100) of the monomer n and $Tg_n$ is the glass transition temperature in degrees Kelvin of the homopolymer of the monomer n. Tg values for homopolymers are listed in Polymer Handbook, 2nd Edition, J. Wiley & Sons, New York (1975).

Mixtures comprising from 20 to 80% by weight, preferably from 30 to 55% by weight, of (meth)acrylates, in particular methyl methacrylate, and from 20 to 80% by weight, preferably from 45 to 70% by weight, of 1,3-diene, in particular 1,3-butadiene, are particularly preferred, it being possible for mixtures optionally also to contain one or more of the above-mentioned auxiliary monomers in the stated amounts, and the amounts in % by weight sum to 100% by weight.

The preparation of the polyvinyl alcohol-stabilized copolymers is carried out by the emulsion polymerization process in the absence of emulsifier, the polymerization temperature being in general from 40° C. to 100° C., preferably from 60° C. to 90° C. The polymerization with 1,3-butadiene is effected under the vapor pressure of the reaction mixture, in general between 2 and 15 bar, at the chosen polymerization temperature. In the copolymerization of gaseous comonomers, such as ethylene or vinyl chloride, it is also possible to employ a higher pressure, in general between 5 bar and 100 bar.

The polymerization is initiated with the at least partially water-soluble, thermal initiators or redox initiator combinations customarily used for the emulsion polymerization. Suitable organic initiators are hydroperoxides such as tert-butyl hydroperoxide, tert-butyl peroxopivalate, cumyl hydroperoxide or isopropylbenzene monohydroperoxide, or azo compounds such as azobisisobutyronitrile. Suitable inorganic initiators are the sodium, potassium and ammonium salts of peroxodisulfuric acid. Said initiators are used in general in an amount of from 0.05 to 3% by weight, based on the total weight of the monomers.

Combinations of said initiators with reducing agents are used as redox initiators. Suitable reducing agents are the sulfites and bisulfites of the alkali metals and of ammonium, for example sodium sulfite, the derivatives of sulfoxylic acid, such as zinc or alkali metal formaldehyde sulfoxylates, for example, sodium hydroxymethanesulfinate, and ascorbic acid. The amount of reducing agent is preferably from 0.01 to 5.0% by weight, based on the total weight of the monomers.

Suitable polyvinyl alcohols are nonionic, partially hydrolyzed polyvinyl acetates and nonionic, partially hydrolyzed polyvinyl esters which have been rendered hydrophobic, and mixtures thereof, it also being possible to use said polyvinyl alcohols as a mixture with further protective colloids.

Nonionic, partially hydrolyzed polyvinyl acetates having a degree of hydrolysis of from 80 to 95 mol % and a Höppler viscosity (4% strength aqueous solution, DIN 53015, Höppler method at 20° C.) of from 1 to 30 mPas, preferably from 2 to 15 mPas are particularly preferred.

Nonionic, partially hydrolyzed polyvinyl esters which have been rendered hydrophobic and, in the form of a 2% strength aqueous solution, produce a surface tension of <40 mN/m are also preferred. Suitable partially hydrolyzed polyvinyl esters which have been rendered hydrophobic can be obtained, for example, by rendering polyvinyl acetate hydrophobic by copolymerization of vinyl acetate with hydrophobic comonomers. Examples of these are isopropenyl acetate, branched and straight-chain vinyl esters having a long chain, preferably having 7 to 15 carbon atoms such as vinyl pivalate, or vinyl ethylhexanoate, vinyl esters of saturated alpha-branched monocarboxylic acids having 5 or 9 to 11 carbon atoms, dialkyl maleates and dialkyl fumarates of $C_1$- to $C_{12}$-alcohols such as diisopropyl maleate and diisopropyl fumarate, vinyl chloride, vinyl alkyl ethers of alcohols having at least 4 carbon atoms, such as vinyl butyl ether, and $C_2$- to $C_{10}$-olefins such as ethene and decene. The imparting of hydrophobic properties can also be effected by polymerization of vinyl acetate in the presence of regulators such as alkyl mercaptans having a $C_2$- to $C_{18}$-alkyl radicals such as dodecyl mercaptan or tert-dodecyl mercaptan. A further possibility for imparting hydrophobic properties to polyvinyl acetate is by polymer-analogous reactions, for example acetylation of vinyl alcohol units in partially hydrolyzed polyvinyl acetate with $C_1$- to $C_4$-aldehydes such as butyraldehyde.

The proportion of hydrophobic units is preferably from 0.1 to 10% by weight, based on the total weight of the partially hydrolyzed polyvinyl acetate. The degree of hydrolysis is from 70 to 99.9 mol %, preferably from 84 to 92 mol %, and the Höppler viscosity (DIN 53015, Höppler method, 4% strength aqueous solution) is from 1 to 30 mPas, preferably from 2 to 15 mPas. Said protective colloids are obtainable by means of processes known to those skilled in the art.

The partially hydrolyzed polyvinyl acetates having from 84 to 92 mol % of vinyl alcohol units and from 0.1 to 10% by weight of units which are derived from vinyl esters of an alpha-branched carboxylic acid having 5 or 9 to 11 carbon atoms in the acid radical, isopropenyl acetate and ethene are particularly preferred as partially hydrolyzed polyvinyl esters which have been rendered hydrophobic; in particular the partially hydrolyzed polyvinyl acetates having vinyl alcohol units and units of vinyl esters of alpha-branched carboxylic acids having 5 or 9 to 11 carbon atoms in said amounts. Examples of such vinyl esters are those which are available as vinyl versatates from Shell, under the names VeoVa$^R$5, VeoVa$^R$9, VeoVa$^R$10 and VeoVa$^R$11. Combinations of the polyvinyl esters which have been mentioned as being particularly preferred and have been rendered hydrophobic with partially hydrolyzed polyvinyl acetates having a degree of hydrolysis of from 80 to 95 mol % and a Höppler viscosity of from 1 to 30 mPas, preferably from 2 to 15 mPas, which, in the form of a 2% strength aqueous solution, produce a surface tension of >40 mN/m, are also particularly preferred.

Further suitable protective colloids which can be used as a mixture with said polyvinyl alcohols are polyvinylpyrrolidones, carboxymethylcellulose, methylcellulose, hydroxyethylcellulose and hydroxypropylcellulose, starches, dextrins, cyclodextrins, poly(meth)acrylic acid, poly(meth)acrylamides, polyvinylsulfonic acids, melamine formaldehyde sulfonates, naphthalene formaldehyde sulfonates, and styrene/maleic acid and vinyl ether/maleic acid copolymers.

The protective colloids are added during the polymerization in general in a total amount of from 1 to 15% by weight, based on the total weight of the monomers. Where a protective colloid combination is used, the weight ratio of hydrophobic, partially hydrolyzed polyvinyl ester to nonhydrophobic, partially hydrolyzed polyvinyl alcohol, is from 10/1 to 1/10.

For controlling the molecular weight, regulating substances (regulators) are preferably used in the polymerization. Examples of such substances are n-dodecyl mercaptan, tert-dodecyl mercaptan, mercaptopropionic acid, methyl mercaptopropionate, isopropanol and acetaldehyde. They are usually used in amounts of from 0.01 to 5.0% by weight, preferably from 0.5 to 2.0% by weight, based in each case on the monomers to be polymerized.

For initiating the polymerization, all of the initiator is initially introduced, some of it is initially introduced and some metered, or all of the initiator is metered in. The total amount of the polyvinyl alcohol or the total amount of further protective colloid and the total amount of the comonomers can be initially introduced. Some can be initially introduced and some metered, or the total amounts can be metered. In a preferred embodiment, the total amount of protective colloid and from 5 to 25% by weight of the total amount of comonomer are initially introduced and the remaining amount of comonomer is metered in during the polymerization. In a further preferred embodiment, the total amount of protective colloid and the total amount of comonomer are initially introduced before initiation of the polymerization and polymerized in the presence of regulator. A procedure in which all of the protective colloid is initially introduced or some of the protective colloid is initially introduced and some of the amount of comonomer and some of the amount of regulator are initially introduced and the remainder in each case is metered in is also preferred. In a possible procedure here, comonomers and regulator are initially introduced and are metered in a constant ratio. The ratio of regulator to comonomer in the initially introduced mixture is greater than that during metering; for this purpose, preferably 15 to 50% by weight of the total amount of the regulator are initially introduced and from 5 to 25% by weight of the total amount of the comonomers are initially introduced.

When a protective colloid combination is used, one component of the protective colloid combination, preferably the hydrophobic, partially hydrolyzed polyvinyl ester, can be initially taken and the other component metered, or a part of the mixture initially taken and the remainder metered in as an aqueous solution.

After the end of the polymerization, postpolymerization can be effected using known methods for removing residual monomers, for example by postpolymerization initiated with a redox catalyst. Volatile residual monomers can also be removed by means of distillation, preferably under reduced pressure, and optionally while passing through or passing over inert entraining gases such as air, nitrogen or steam.

The aqueous dispersions obtainable with the process according to the invention have a solids content of from 30 to 75% by weight, preferably from 40 to 65% by weight. For the preparation of polymer powders redispersible in water, the aqueous dispersions are dried, for example by means of fluidized-bed drying, freeze-drying or spray-drying. Preferably, the dispersions are spray-dried. The spray-drying is effected in conventional spray drying units, it being possible to carry out the atomization by means of airless high-pressure nozzles, binary nozzles or multi-media nozzles or using a rotating disk. The outlet temperature is generally chosen in the range from 55° C. to 100° C., preferably from 70° C. to 90° C., depending on the unit, the Tg of the resin and the desired degree of drying.

The total amount of protective colloid before the drying process should preferably be at least 10% by weight, based on the amount of polymer. To ensure redispersibility, it is as a rule necessary to add further protective colloids as an atomization aid to the dispersion prior to drying. As a rule, the atomization aid is used in an amount of from 5 to 25% by weight, based on the polymeric components of the dispersion.

Suitable atomizing aids are partially hydrolyzed polyvinyl acetates; polyvinylpyrrolidones; polysaccharides in water-soluble form such as starches (amylose and amidopectin), celluloses and their carboxymethyl, methyl, hydroxyethyl and hydroxypropyl derivatives; proteins such as casein or caseinate, soy protein, gelatin; ligninsulfonates; synthetic polymers such as poly(meth)acrylic acid, copolymers of (meth)acrylates with comonomer units having carboxyl functional groups, poly(meth)acrylamide, polyvinylsulfonic acids and their water-soluble copolymers; melamine formaldehyde sulfonates, naphthalene formaldehyde sulfonates and styrene/maleic acid and vinyl ether/ maleic acid copolymers. Preferred atomization aids are partially hydrolyzed polyvinyl acetate having a degree of hydrolysis of from 80 to 95 mol %, a Höppler viscosity of from 1 to 30 mPas, which may have been modified with isopropenyl acetate or vinyl ether units.

During the atomization, a content of up to 1.5% by weight of antifoam, based on the base polymer, has in many cases proven advantageous. For increasing the shelf-life by improving the blocking stability, in particular in the case of powders having a low glass transition temperature, an antiblocking agent (anticaking agent) can be added to the powder obtained, preferably in an amount of up to 30% by weight based on the total weight of polymeric components. Examples of antiblocking agents are calcium and magnesium carbonate, talc, gypsum, silica and silicates having particle sizes preferably in the range from 10 nm to 10 $\mu$m.

For improving the performance characteristics, further additives may be added during the atomization. Further components of dispersion powder compositions, which are present in preferred embodiments are, for example, pigments, fillers, foam stabilizers and water repellents.

The polyvinyl alcohol-stabilized 1,3-diene/(meth)acrylic acid copolymers can be used in the form of their aqueous polymer dispersions or polymer powders redispersible in water, in the applications typical for them, for example, in chemical products for the building industry in combination with hydraulically setting binders such as cements (Portland cement, high-alumina cement, trass cement, slag cement, magnesia cement and phosphate cement), gypsum or waterglass, for the preparation of construction adhesives, renders, filling compounds, floor filling compounds, sealing slurries, joint mortars and paints, and furthermore, as sole binders for coating materials and adhesives or as coating materials or binders for textiles and paper.

An example of the use as an adhesive is the adhesive bonding of porous substrates such as the adhesive bonding of wood to give a wood-wood bond, the adhesive bonding of wood to absorptive substrates such as floor topping, in particular parquet bonding. Further applications are the water-resistant adhesive bonding of paper and board, for example, as packaging adhesive and bookbinding adhesive. As adhesives, the copolymers are also suitable for the adhesive bonding of fiber materials comprising natural or synthetic fibers, for example, for the production of wood fiberboards, for binding nonwovens comprising natural or synthetic fibers, with the production of moldings from fiber materials and for the production of precursors of such moldings, the so-called semifinished products (waddings). Further application examples are the binding of cotton, for example, of upholstery, insulation and filter waddings, and the production of laminates such as insulating materials.

Preference is given to the use as gypsum mortar for filling compounds, joint fillers, flowable $CaSO_4$ floor toppings, joint compounds or adhesive mortars or the use for the production of plasterboards or plaster shapes. Further applications are, for example, renders or stucco work, including outdoors. The customary applications for the corresponding and modified $CaCO_3$ materials are as joint fillers, gypsum-free filling compounds and renders. In general, the copolymer is used in an amount of from 0.2 to 15% by weight, based on the dry weight of the formulation.

The use in self-leveling floor filling compounds (leveling compounds) and floor toppings is also preferred. Preferably, from 0.5 to 10% by weight of dispersion powder, based on the dry weight of the formulation, are added. The formulations also contain from 5 to 80% by weight of inorganic, hydraulically setting binders, such as cement, gypsum or mixtures thereof. The formulation also contains from 5 to 80% by weight of inorganic fillers such as sand, quartz powder, chalk, limestone powder, filter ash or mixtures thereof. In order to improve the leveling properties, additives which promote leveling such as casein or cement liquefiers can, if required also be added to the dry mixture. The data in % by weight are always based on 100% by weight of dry mass in the formulation for floor filling compounds. The ready-to-use leveling compound is finally obtained by mixing water with the above-mentioned dry mixture.

The ready-to-use floor filling compound mixed with water can be used for the production of floor toppings and self-leveling coatings for leveling, evening out and smoothing surfaces.

A further preferred use of the dispersions and powders is that in cement-containing construction adhesive formulations. Typical formulations contain from 5 to 80% by weight of cement, from 5 to 80% by weight of fillers such as quartz sand, calcium carbonate or talc, from 0.1 to 2% by weight of thickeners such as cellulose ethers, sheet silicates or polyacrylates, from 0.5 to 60% by weight of the PVA1-stabilized (meth)acrylate/1,3-diene copolymers in the form of the polymer dispersion or the polymer powder and optionally, further additives for improving stability, processibility, open time and water resistance. The data in % by weight are always based on 100% by weight of dry mass of the formulation. Said cement-containing construction adhesive formulations are used in particular as tile adhesives for laying tiles of all kinds (earthenware, stoneware, porcelain, ceramic, natural tiles) indoors and outdoors and are mixed with the corresponding amount of water before their use.

An advantage of the (meth)acrylate/1,3-diene copolymers prepared according to the invention is their hydrolysis stability which improves with increasing 1,3-diene content compared with pure acrylate copolymers. Consequently, the mechanical copolymer properties such as tensile strength and elongation at break, remain unchanged even on application to alkaline surfaces. Furthermore, no toxicological controversial alcohols such as, for example, butanol or 2-ethylhexanol, or only small amounts thereof, are released on alkaline surfaces with such hydrolysis-stable systems. Compared with styrene/acrylate copolymers, the copolymers prepared according to the invention have, owing to their advantageous viscoelastic properties, in particular for adhesive applications, improved performance characteristics, in particular, high surface tack, high adhesion (peel strength) and high cohesion (shear stability). The outstanding cement stability, in particular of the copolymers stabilized with hydrophobically modified polyvinyl alcohols, is also noteworthy. The (meth)acrylate/1,3-diene copolymers prepared according to the invention also have the advantageous rheological properties (machine running properties) of vinyl ester or acrylate dispersions stabilized with polyvinyl alcohol.

The following examples serve for further explanation of the invention:

EXAMPLE 1

1110 ml of demineralized water, 538 g of a 20% strength by weight aqueous solution of a partially hydrolyzed polyvinyl acetate having a degree of hydrolysis of 88 mol %, a Höppler viscosity of the 4% strength solution of 4 mPas (DIN 53015, Höppler method at 20° C.), which, when dissolved in water in an amount of 2% by weight, produced a surface tension of 44 mN/m, and 363 g of a 20% strength by weight aqueous solution of a partially hydrolyzed copolymer of vinyl acetate and VeVoa$^R$10, having a degree of hydrolysis of 88 mol %, a Höppler viscosity of the 4% strength solution of 4 mPas, which, when dissolved in water in an amount of 2% by weight, produced a surface tension of 37 mN/m, were initially introduced into a stirred autoclave having a capacity of about 5l. The pH was adjusted to 4.0 to 4.2 with 10% strength by weight formic acid. Thereafter, evacuation was effected, flushing was carried out with nitrogen, evacuation was effected again and a mixture of 151 g of methyl methacrylate, 129 g of 1,3-butadiene and 8.5 g of tert-dodecyl mercaptan was sucked in. This mixture was stabilized to prevent premature polymerization by adding 30 mg of benzoquinone.

After heating up to 80° C., the polymerization was initiated by simultaneously introducing two catalyst solutions, the first of which comprised 110 g of demineralized water and 15.5 g of a 40% strength aqueous tert-butyl hydroperoxide solution and the other comprised 116 g of demineralized water and 13 g of sodium formaldehyde sulfoxylate, the metering of the two catalyst solutions being effected at the same feed rate (18 ml/h). After the beginning of polymerization, the metered addition of a mixture of 729 g of 1,3-butadiene, 856 g of methyl methacrylate and 9.5 g of tert-dodecyl mercaptan was started at a rate of 5.3 g/min. After the end of the monomer feed, postpolymerization was effected for a further 2 h at 80° C. with unchanged feed rate of the initiator solution, after which the feed of the initiator solutions was ended and cooling was carried out.

A stable, coarse-particled (Coulter LS 230; Dw=950 nm) and coagulum-free dispersion which had a solids content of 51% and a viscosity (Brookfield viscometer, 20° C., 20 rpm) of 380 mPas was obtained.

EXAMPLE 2

The dispersion was prepared analogously to Example 1 but with initial introduction of 900 g of a 20% strength by weight aqueous solution of a partially hydrolyzed polyvinyl acetate having a degree of hydrolysis of 88 mol %, a Höppler viscosity of the 4% strength solution of 4 mPas, which, when dissolved in water in an amount of 2% by weight, produced a surface tension of 44 mN/m, as the only protective colloid. All other measures corresponded to Example 1. 50% by weight of a 10.3% strength by weight solution of polyvinyl alcohol (partially hydrolyzed polyvinyl acetate, degree of hydrolysis 88 mol %) were added to the dispersion and the latter was sprayed through a binary nozzle. The atomization component used was air precompressed to 4 bar, and the drops formed were dried by the countercurrent method with air heated to 125° C. 10% of commercial antiblocking agent (mixture of calcium magnesium carbonate and magnesium hydrosilicate) were added to the dry powder obtained.

A 50% strength redispersion of the powder was used for testing.

EXAMPLE 3

The dispersion was prepared analogously to Example 1 but with initial introduction of 900 g of a 20% strength by weight aqueous solution of a partially hydrolyzed copolymer of vinyl acetate and VeoVa$^R$10 having a degree of hydrolysis of 88 mol % and a Höppler viscosity of the 4% strength solution of 4 mPas, which, when dissolved in water in an amount of 2% by weight, produced a surface tension of 37 mN/m, as the only protective colloid. All other measures corresponded to Example 1.

The dispersion was dried analogously to Example 2. A 50% strength redispersion of the powder was used for testing.

EXAMPLE 4

The dispersion was prepared analogously to Example 1, 800 g of a 10% strength by weight aqueous solution of a yellow dextrin (Avedex 35, from Avebe), which, when dissolved in water in an amount of 2% by weight, produced a surface tension of 50 mN/m, together with the hydrophobically modified polyvinyl alcohol, being used instead of the partially hydrolyzed polyvinyl acetate. All other measures corresponded to Example 1.

EXAMPLE 5

The dispersion was prepared analogously to Example 1 but with initial introduction of 137 g of methyl methacrylate, 143 g of 1,3-butadiene and 9.4 g of tert-dodecyl mercaptan. A mixture consisting of 777 g of methyl methacrylate, 808 g of 1,3-butadiene and 10.5 g of tert-dodecyl mercaptan was metered in. All other measures corresponded to Example 1.

EXAMPLE 6

The dispersion was prepared analogously to Example 1 but with initial introduction of 120 g of methyl methacrylate, 159 g of 1,3-butadiene and 10.4 g of tert-dodecyl mercaptan. A mixture consisting of 682 g of methyl methacrylate, 904 g of 1,3-butadiene and 11.6 g of tert-dodecyl mercaptan was metered in. All other measures corresponded to Example 1.

EXAMPLE 7

The dispersion was prepared analogously to Example 1 but with initial introduction of 103 g of methyl methacrylate, 176 g of butadiene and 11.5 g of tert-dodecyl mercaptan. A mixture consisting of 587 g of methyl methacrylate, 999 g of 1,3-butadiene and 12.9 g of tert-dodecyl mercaptan was metered in. All other measures corresponded to Example 1.

EXAMPLE 8

The dispersion was prepared analogously to Example 1 but with initial introduction of 84 g of methyl methacrylate, 196 g of butadiene and 12.8 g of tert-dodecyl mercaptan. A mixture consisting of 475 g of methyl methacrylate, 1110 g of 1,3-butadiene and 14.3 g of tert-dodecyl mercaptan was metered in. All other measures corresponded to Example 1.

Comparative Example 1

The dispersion was prepared analogously to Example 1 but with initial introduction of 78 g of styrene and 201 g of n-butyl acrylate. A mixture consisting of 444 g of styrene and 1142 g of n-butyl acrylate was metered in. The addition of tert-dodecyl mercaptan was dispensed with. All other measures corresponded to Example 1.

Comparative Example 2

The dispersion was prepared analogously to Example 1, styrene being used instead of methyl methacrylate, both in the initially introduced mixture and in the metering. All other measures corresponded to Example 1.

Comparative Example 3

The dispersion was prepared analogously to Example 1 but with initial introduction of 78 g of methyl methacrylate and 201 g of n-butyl acrylate. A mixture consisting of 444 g of methyl methacrylate and 1142 g of n-butyl acrylate was metered in. The addition of tert-dodecyl mercaptan was dispensed with. All other measures corresponded to Example 1.

Comparative Example 4

The dispersion was prepared analogously to Example 1 but with initial introduction of 137 g of styrene, 143 g of 1,3-butadiene and 9.4 g of tert-dodecyl mercaptan. A mixture of 777 g of styrene, 808 g of 1,3-butadiene and 10.5 g of tert-dodecyl mercaptan was metered in. All other measures corresponded to Example 1.

Comparative Example 5

The dispersion was prepared analogously to Example 1 but with initial introduction of 120 g of styrene, 159 g of 1,3-butadiene and 10.4 g of tert-dodecyl mercaptan. A mixture of 682 g of styrene, 904 g of 1,3-butadiene and 11.6 g of tert-dodecyl mercaptan was metered in. All other measures corresponded to Example 1.

Comparative Example 6

The dispersion was prepared analogously to Example 1 but with initial introduction of 103 g of styrene, 176 g of 1,3-butadiene and 11.5 g of tert-dodecyl mercaptan. A mixture of 587 g of styrene, 999 g of 1,3-butadiene and 12.9 g of tert-dodecyl mercaptan was metered in. All other measures corresponded to Example 1.

Comparative Example 7

The dispersion was prepared analogously to Example 1 but with initial introduction of 84 g of styrene, 196 g of 1,3-butadiene and 12.8 g of tert-dodecyl mercaptan. A mixture of 475 g of styrene, 1110 g of 1,3-butadiene and 14.3 g of tert-dodecyl mercaptan was metered in. All other measures corresponded to Example 1.

Testing the Performance Characteristics

For all measurements, the dispersions or redispersions to be tested were applied to the substrate film by means of a doctor blade in a thickness such that a uniform polymer layer of from 24 to 26 g/m³ remained after drying.

Surface Tack

A 20 cm long and 2.5 cm wide polymer strip (substrate material: PVC containing polymer plasticizer, 0.1 mm thick) was clamped in the upper jaw of a tensile tester in the form of a loop, suspended vertically with the polymer layer facing outward. The "loop" was then placed in a length of about 3 cm on a horizontally fastened, carefully cleaned glass plate, without application of pressure, vertically at a speed of 100 mm/minute, by bringing together the two jaws of the tensile tester. The polymer strip was then immediately pulled off from the surface at the same speed. The highest force required for pulling off the loop was taken as a measure of the surface tack. The stated value in N/2.5 cm is the mean value of five individual measurements, a fresh polymer strip and a fresh glass surface being used each time.

Adhesion (Peel Strength PS)

A 20 cm long and 2.5 cm wide polymer strip was placed, without bubbles, starting from one end in a length of about 12 cm, on a carefully cleaned crystal glass surface. The polymer strip was pressed down by rolling five times (back and forth) with a 2.2 kg steel roll covered with silicone rubber. After storage for eight minutes and 24 hours in a conditioning chamber at 23° C. and 50% relative humidity, the polymer strip was peeled off over a length of 5 cm at a speed of 300 mm/minute at an angle of 180°. The average force required for this purpose was measured. The stated values in N/2.5 cm are mean values of five individual measurements in each case.

Cohesion (Shear Stability SS)

A 5 cm long and 2.5 cm wide polymer strip was placed, without bubbles, with an area of 2.5 cm×2.5 cm, on a carefully cleaned glass plate so that the remaining piece of polymer strip projected beyond the edge of the glass plate. The strip was pressed down by rolling (five times back and forth) with a 2.2 kg steel roll covered with silicone rubber. After a bonding time of eight minutes, a glass plate was fastened in a holder at an angle of 2° to the perpendicular (in order reliably to rule out peel forces) in such a way that the free end of the polymer strip hung down. A weight of 2 kg was freely suspended from this end. The time taken for the free end of the polymer strip to become detached from the glass plate under the tension of the weight was determined. The measurement was carried out in a conditioning chamber at 23° C. and 50% relative humidity. The stated values in minutes are mean values of three individual measurements in each case.

Determination of the Hydrolysis Stability

A representative sample was taken from the dispersions having a solids content adjusted to 50% by weight (with demineralized water) and the dispersion was to contain no air bubbles. With the aid of a film castor, a dispersion film having a wet film thickness of 500 µm was produced on a substrate material (substrate material: PVC containing polymer plasticizer, 0.1 mm thick) and was subsequently dried to room temperature for 24 h with formation of a polymer film. Film pieces measuring 10 cm×10 cm were then punched out of the dispersion film obtained. A 10 cm×10 cm film piece was then introduced into a 500 ml conical flask filled with 350 ml of aqueous 1.0 N potassium hydroxide solution. The conical flask was closed with a stopper and was left at 70° C. in a conditioning chamber for 24 h. Thereafter, the dispersion film was removed from the KOH solution, washed with demineralized water and dabbed dry with a paper web. The film piece treated with alkali and an untreated film piece were dried for 24 h under standard temperature and humidity conditions (23° C., 50% atmospheric humidity) before test specimens measuring 50 mm×8 mm, according to DIN 53504/NSt S3a, were punched out of them. Test specimens of the dispersion film treated with alkali and of the untreated dispersion film were then tested with respect to tensile strength and elongation at break under standard conditions according to DIN 53504.

The test results are summarized in table 1.

Comparison of Example 1 with comparative Examples 1 and 2 shows that the 1,3-butadiene/methyl methacrylate copolymers have substantially better adhesion and cohesion than the corresponding styrene/butyl acrylate (comparative Example 1) and styrene/1,3-butadiene copolymers.

Comparison of Example 1 with comparative Example 3 shows that the 1,3-butadiene/methyl methacrylate copolymers are substantially more stable to hydrolysis than the corresponding butyl acrylate/methyl methacrylate copolymer. In the case of the latter, the alkali treatment leads to a substantial deterioration in elongation at break and tensile strength.

Comparison of Examples 5 to 8 with comparative Examples 4 to 7 shows that the methyl methacrylate/butadiene copolymers have substantially better tack than the styrene/butadiene copolymers, Tg being identical.

TABLE 1

| | | | Untreated | | Alkali-treated | | | | |
|---|---|---|---|---|---|---|---|---|---|
| Ex. | Polymer | Tg [° C.] | EB [%] | TS [N/mm$^2$] | EB [%] | TS [N/mm$^2$] | Tack [N/2.5 cm] | SS [min] | PS [N/2.5 cm] |
| 1 | Bu/MMA | −10 | 345 | 12.3 | 305 | 10.1 | 2.1 | 2100 | 10.3 |
| 2 | Bu/MMA | −10 | 332 | 13.1 | 301 | 11.2 | 2.0 | 2300 | 11.1 |
| 3 | Bu/MMA | −10 | 360 | 12.7 | 306 | 10.8 | 2.2 | 2250 | 10.8 |
| 4 | Bu/MMA | −10 | 310 | 13.3 | 295 | 11.5 | 2.1 | 2400 | 10.9 |
| 5 | Bu/MMA | −20 | 395 | 14.7 | 370 | 14.9 | 5.1 | >3000 | 12.9 |
| 6 | Bu/MMA | −30 | 450 | 16.1 | 455 | 15.9 | 8.7 | >3000 | 14.9 |
| 7 | Bu/MMA | −40 | 485 | 18.3 | 478 | 18.2 | 11.5 | >3000 | 16.0 |
| 8 | Bu/MMA | −50 | 520 | 19.1 | 526 | 19.0 | 14.1 | >3000 | 19.4 |
| Com. 1 | St/A | −10 | 298 | 10.5 | 290 | 8.7 | 1.3 | 320 | 7.3 |
| Com. 2 | St/Bu | −10 | 335 | 13.2 | 330 | 12.5 | 1.8 | 420 | 6.9 |
| Com. 3 | MMA/A | −10 | 256 | 14.3 | 155 | 6.2 | 2.3 | 1900 | 10.2 |
| Com. 4 | St/Bu | −20 | 365 | 16.3 | 355 | 16.1 | 2.1 | 1600 | 8.3 |
| Com. 5 | St/Bu | −30 | 420 | 18.5 | 415 | 18.1 | 4.1 | 2150 | 9.8 |
| Com. 6 | St/Bu | −40 | 480 | 19.2 | 482 | 19.0 | 4.7 | 2850 | 10.4 |
| Com. 7 | St/Bu | −50 | 523 | 19.3 | 510 | 19.1 | 5.8 | >3000 | 11.7 |

Bu = 1,3-butadiene,
MMA = methyl methacrylate,
St = styrene,
A = n-butyl acrylate

We claim:

1. An emulsifier- and solvent-free copolymer, stabilized with nonionic polyvinyl alcohol as a protective colloid, of 1,3-butadiene and/or isoprene with a methacrylate of a $C_{1-10}$ straight chain or branched alcohol and/or an acrylate of a $C_{1-10}$ straight chain or branched alcohol, in the form of its aqueous polymer dispersion or polymer powder redispersible in water, obtainable by emulsion polymerization and optionally drying of the polymer dispersion obtainable thereby, from 10 to 100% by weight of the amount of polyvinyl alcohol being initially introduced before the initiation of the polymerization and the remaining amount being metered in during polymerization, and the addition of the polyvinyl alcohol and of the comonomers being controlled in such a way that, during the polymerization, the amount of protective colloid is always from 1 to 70% by weight of the total amount of free comonomers.

2. A process for the preparation of emulsifier- and solvent-free copolymers, stabilized with polyvinyl alcohol as a protective colloid, of 1,3-butadiene and/or isoprene with a methacrylate of a $C_{1-10}$ straight chain or branched alcohol and/or an acrylate of a $C_{1-10}$ straight chain or branched alcohol, in the form of their aqueous polymer dispersions or polymer powders redispersible in water, by emulsion polymerization in the presence of from 1 to 15% by weight, based on the total weight of the monomers, of at least one polyvinyl alcohols and optionally drying of the polymer dispersions obtainable thereby, from 10 to 100% by weight of the amount of polyvinyl alcohol being initially introduced before the initiation of the polymerization and the remaining amount being metered in during polymerization, and the addition of polyvinyl alcohol and of the comonomers being controlled in such a way that, during the polymerization the amount of protective colloid is always from 1 to 70% by weight of the total amount of free comonomers.

3. The process as claimed in claim 2, wherein mixtures comprising from 20 to 80% by weight of (meth)acrylates and from 80 to 20% by weight of 1,3-diene are polymerized, it being possible for the mixtures optionally also to contain one or more of the above-mentioned auxiliary monomers in the stated amounts, and the amounts in % by weight summing to 100% by weight.

4. The process as claimed in claim 2, wherein the methacrylates and acrylates copolymerized are at least one member selected from the group consisting of methyl methacrylate, ethyl methacrylate, propyl methacrylate, n-butyl methacrylate, methyl acrylate, ethyl acrylate, propyl acrylate, n-butyl acrylate, tert-butyl acrylate, tert-butyl methacrylate and 2-ethylhexyl acrylate.

5. The process as claimed of claim 2, wherein 1,3-butadiene and methyl methacrylate are copolymerized.

6. The process as claimed in claim 2, wherein the polyvinyl alcohol used comprises at least one member selected from the group consisting of the partially hydrolyzed polyvinyl acetates and partially hydrolyzed polyvinyl esters which have been rendered hydrophobic.

7. The process as claimed in claim 2, wherein the polyvinyl alcohol used comprises partially hydrolyzed polyvinyl acetates having a degree of hydrolysis of from 80 to 95 mol % and a Höppler viscosity of from 1 to 30 mPas.

8. The process as claimed in claim 2, wherein the polyvinyl alcohol used comprises partially hydrolyzed polyvinyl esters which have been rendered hydrophobic and, in the form of a 2% strength aqueous solution, produce a surface tension of ≦40 mN/m.

9. The process as claimed in claim 8 wherein partially hydrolyzed polyvinyl acetates having from 84 to 92 mol % of vinyl alcohol units and from 0.1 to 10% by weight of units which are derived from vinyl esters of an alpha-branched carboxylic acid having 5 or 9 to 11 carbon atoms in the acid radical, isopropenyl acetate and ethene are used.

10. The process as claimed in claim 2, wherein a combination of polyvinyl ester which has been rendered hydrophobic and partially hydrolyzed polyvinyl acetate is used as the polyvinyl alcohol.

11. The process as claimed in claim 2, wherein the polymerization is carried out in the presence of regulators.

12. The process as claimed in claim 11, wherein the regulator used comprises at least one substance selected from the group consisting of n-dodecyl mercaptan, tert-dodecyl mercaptan, mercaptopropionic acid, methyl mercaptopropionate, isopropanol and acetaldehyde.

13. The process as claimed in claim 2, wherein the aqueous dispersions obtained thereby are dried by means of fluidized-bed drying, freeze-drying or spray-drying.

14. The process as claimed in claim 2, wherein the total amount of protective colloid and from 5 to 25% by weight of the total amount of comonomer are initially introduced and the remaining amount of comonomer is metered in during polymerization.

15. The process as claimed in claim 2, wherein the total amount of protective colloid and the total amount of comonomer are initially introduced before the initiation of polymerization and are polymerized in the presence of a regulator.

16. The process as claimed in claim 2, wherein some of the amount of comonomer and some of the amount of regulator are initially introduced, with initial introduction of all of the protective colloid or with initial introduction of some of the protective colloid, and the remainder in each case is metered in.

\* \* \* \* \*